United States Patent
Wang et al.

(10) Patent No.: US 12,497,448 B2
(45) Date of Patent: Dec. 16, 2025

(54) STABLE SECUKINUMAB INJECTION AND PREPARATION METHOD THEREFOR

(71) Applicant: TONGHUA DONGBAO PHARMACEUTICAL CO., LTD., Jilin (CN)

(72) Inventors: Depeng Wang, Jilin (CN); Shanshan Wei, Jilin (CN); Xindan Fan, Jilin (CN); Zhongyu Zhang, Jilin (CN); Nan Zhang, Jilin (CN); Chunsheng Leng, Jilin (CN); Xiaohui Chang, Jilin (CN)

(73) Assignee: TONGHUA DONGBAO PHARMACEUTICAL CO., LTD., Jilin (CN)

( * ) Notice: Subject to any disclaimer, the term of this patent is extended or adjusted under 35 U.S.C. 154(b) by 1034 days.

(21) Appl. No.: 17/441,366

(22) PCT Filed: May 18, 2020

(86) PCT No.: PCT/CN2020/090776
§ 371 (c)(1),
(2) Date: Sep. 21, 2021

(87) PCT Pub. No.: WO2020/233540
PCT Pub. Date: Nov. 26, 2020

(65) Prior Publication Data
US 2022/0177563 A1 Jun. 9, 2022

(30) Foreign Application Priority Data
May 17, 2019 (CN) .......................... 201910412754.0

(51) Int. Cl.
C07K 16/24 (2006.01)
A61K 39/00 (2006.01)
A61K 47/18 (2017.01)
A61K 47/26 (2006.01)

(52) U.S. Cl.
CPC .......... *C07K 16/244* (2013.01); *A61K 47/183* (2013.01); *A61K 47/26* (2013.01); *A61K 2039/545* (2013.01)

(58) Field of Classification Search
CPC .... C07K 16/244; A61K 47/183; A61K 47/26; A61K 2039/545
See application file for complete search history.

(56) References Cited

U.S. PATENT DOCUMENTS

2011/0044977 A1 2/2011 Adler et al.
2017/0368174 A1 12/2017 Joerg et al.
2019/0300603 A1 10/2019 Bannister et al.

FOREIGN PATENT DOCUMENTS

| CN | 104666242 A | 6/2015 | | |
|---|---|---|---|---|
| CN | 104922668 A | 9/2015 | | |
| CN | 105168125 A | 12/2015 | | |
| CN | 105727285 A | * 7/2016 | | |
| CN | 107257692 A | 10/2017 | | |
| CN | 109689101 A | 4/2019 | | |
| CN | 110179746 A | 8/2019 | | |
| JP | 2000-186046 A | 7/2000 | | |
| JP | 2018-502910 A | 2/2018 | | |
| JP | 2018-523676 A | 8/2018 | | |
| WO | WO 2012/059598 A2 | 5/2012 | | |
| WO | WO 2015/190378 A1 | 12/2015 | | |
| WO | WO-2016103153 A1 | * 6/2016 | .............. | A61P 37/06 |
| WO | WO 2018/060210 A1 | 4/2018 | | |
| WO | WO 2019/065979 A1 | 4/2019 | | |
| WO | WO 2020/233540 A1 | 11/2020 | | |

OTHER PUBLICATIONS

International Search Report and Written opinion for PCT International Patent Application No. PCT/CN2020/090776, dated Aug. 21, 2020.
Zhang et al., "Diphasic function of xylitol in osmotic pump preparations as a novel excipient", Chinese Journal of new Drugs, 2009, 23: 2264-2268.
Extended European Search Report for European Patent Application No. 20809851.7 dated Feb. 3, 2023.
Lim et al., "Process cycle development of freeze drying for therapeutic proteins with stability evaluation", Journal of Pharmaceutical Investigation, Aug. 30, 2016, 46(6): 519-536.
Daugherty et al., "Formulation and delivery issues for monoclonal antibody therapeutics", Advances Drug Deliver Reviews, Aug. 7, 2006, 58(5-6): 686-706, Epublished May 22, 2006.
Mazer-Amirshahi et al., "Critical Drug Shortages: Implications for Emergency Medicine", Acad Emerg Med., Jun. 2014, 21(6): 704-711.
Wang et al., "Antibody Structure, Instability, and Formulation", Journal of Pharm Sci., Jan. 2007, 96(1): 1-26.

* cited by examiner

*Primary Examiner* — Daniel E Kolker
*Assistant Examiner* — Maureen Varina Driscoll
(74) *Attorney, Agent, or Firm* — LATHROP GPM LLP; James H. Velema, Esq.

(57) ABSTRACT

Provided are a stable secukinumab injection and a preparation method therefor. The stable secukinumab injection is composed of the following ingredients: 50 mg/ml-300 mg/ml of secukinumab, 5 mmol/L-50 mmol/L of histidine and a histidine hydrochloride, 5 mmol/L-50 mmol/L of methionine, 150 mmol/L-400 mmol/L of a low-sugar alcohol, and 0.01%-0.02 of polysorbate 80, wherein the balance is water for injection, and the pH is 5.0-7.0. Stability tests prove that the quality of the stable secukinumab injection is stable, wherein the stability thereof is superior to that of commercial varieties on the market, and same has various indicators that meet the relevant regulations of the Chinese Pharmacopoeia, and has good application prospects.

8 Claims, No Drawings

STABLE SECUKINUMAB INJECTION AND PREPARATION METHOD THEREFOR

CROSS REFERENCE TO RELATED APPLICATIONS

This application claims the priority of Chinese Patent Application No. 201910412754.0, filed to China National Intellectual Property Administration on May 17, 2019, and titled with "STABLE SECUKINUMAB INJECTION AND PREPARATION METHOD THEREFOR", and the disclosures of which are hereby incorporated by reference.

FIELD

The present disclosure relates to the field of biopharmaceuticals and preparations, specifically to a stable secukinumab injection and preparation method thereof.

BACKGROUND

Psoriasis is a chronic immune-mediated skin disease, with approximately 125 million patients worldwide, and as many as 6.5 million patients with psoriasis in China.

Secukinumab is a fully humanized monoclonal anti-IL-17A IgG1 antibody. IL-17A is an inflammatory cytokine. Upon binding to IL-17A, the antibody directly blocks the interaction between IL-17A and its receptor, resulting in changes of immunity and inflammation response, to thereby achieve the purpose of treatment.

Cosentyx® (active ingredient: Secukinumab) is the world's first biologic drug targeting IL-17A developed by Novartis, and it has been confirmed that its efficacy in the treatment of psoriasis surpasses traditional TNFα-targeting biological preparations such as Enbrel and Humira. However, it is not currently on the market in China, where there is a lack of corresponding drug varieties. As a biological antibody drug, the stability of an antibody preparation is a key factor of drug quality control. The inventors found in the preliminary search that the original drug (CN201580076632.9) usually employs trehalose as a stabilizer for preparation. Since other stabilizers are currently uncertain for use, there are very few international and domestic drug varieties, leading to a poor substitutability of this drug.

SUMMARY

In order to solve the above technical problems, the present disclosure provides a stable secukinumab injection comprising 50-250 mg/ml of secukinumab, 5-50 mmol/L of histidine and histidine hydrochloride, 5-40 mmol/L of methionine, 150-370 mmol/L of low molecular weight sugar alcohol, and 0.01%-0.02% polysorbate 80, water for injection is used as balance, pH 5.0-7.0.

In the present disclosure, the inventors have screened out a class of low molecular weight sugar alcohols, preferably sorbitol or xylitol. In the field of injections, sorbitol is often used as a carrier for sugar-free preparations and a stabilizer for drugs, with a commonly used concentration range of 10%-25%.

Xylitol, with a commonly used concentration range of 5%-10%, is used as a sugar substitute for diabetic patients.

There is no report on the application of sorbitol and xylitol in secukinumab injection.

After preliminary literature search and experimental screening, the inventors found a new type of stabilizer, a class of low molecular weight sugar alcohols, especially sorbitol and xylitol. In the process of screening stabilizers, the inventors made a comparison between injections added with the low molecular weight sugar alcohols and those in the preferred examples of the original drug, and conducted stability tests, including physical stability (SEC-HPLC, SEC polymer protein: General Requirements of Chinese Pharmacopoeia 2015), visible particles (Reference could be made to General Requirements of Chinese Pharmacopoeia 2015, 0904) and insoluble particles (Reference could be made to General Requirements of Chinese Pharmacopoeia 2015, 0903) measured by light blockage method, as well as chemical stability (CEX-HPLC, lysine variant, Reference could be made to General Requirements of Chinese Pharmacopoeia 2015, IIIB appendix) under long-term (4° C.), accelerated (25° C.) and high temperature (40° C.) conditions. The stability results show that the stability of the secukinumab injection prepared by the present disclosure is superior to that of the secukinumab injection in the prior art (trehalose as a stabilizer, which is in the formula of original drug injection).

Preferably, the present disclosure provides a stable secukinumab injection, comprising 100-250 mg/ml of secukinumab, 10-40 mmol/L of histidine and histidine hydrochloride, 5-40 mmol/L of methionine, 180-350 mmol/L of low molecular weight sugar alcohol, and 0.01%-0.02% polysorbate 80, in water for injection, pH 5.5-6.5.

Preferably, the present disclosure provides a stable secukinumab injection, comprising 140-200 mg/ml of secukinumab, 10-35 mmol/L of histidine and histidine hydrochloride, 5-30 mmol/L of methionine, 180-300 mmol/L of low molecular weight sugar alcohol, and 0.02% polysorbate 80, in water for injection, pH 5.5-6.5.

Preferably, the present disclosure provides a stable secukinumab injection, comprising 140-160 mg/ml of secukinumab, 10-30 mmol/L of histidine and histidine hydrochloride, 5-20 mmol/L of methionine, 210-280 mmol/L of low molecular weight sugar alcohol, and 0.02% polysorbate 80, in water for injection, pH 5.5-6.5.

Preferably, in the above-mentioned stable secukinumab injection, the low molecular weight sugar alcohol is sorbitol or xylitol.

More preferably, the low molecular weight sugar alcohol is xylitol.

More preferably, the pH of the injection is 5.8.

The present disclosure further provides a method for producing the above-mentioned stable secukinumab injection, comprising 1) preparing buffer
   buffer A: weighing histidine, methionine, and the low molecular weight sugar alcohol according to a formula, adding water for injection until reaching formula concentrations, stirring and mixing well;
   buffer B: weighing histidine hydrochloride, methionine, and the low molecular weight sugar alcohol according to a formula, adding water for injection until reaching formula concentrations, stirring and mixing well;
   adding buffer A to buffer B, adjusting to final pH, which is a final buffer; and
2) preparing a finished product
   a. concentrating purified secukinumab by ultrafiltration;
   b. determining the concentration of the concentrated protein by taking out the concentrated protein, measuring the volume of the concentrated protein, determining protein concentration, and starting to replace buffer when the protein concentration reaches 100-120 mg/ml;

c. replacing buffer by adding the final buffer at a volume equal to that of the concentrated protein into a sample cup, mixing well and repeating the replacement procedure several times, until the protein concentration is 100-120 mg/ml; and
d. concentrating the secukinumab by ultrafiltration after replacing buffer, adding polysorbate 80, and performing sterile filtration.

Further, the specific preparation method comprises:
1) preparing buffer:
buffer A: weighing 10-30 mmol/L of histidine, 5-20 mmol/L of methionine, and 210-280 mmol/L of sorbitol according to a formula, adding water for injection until reaching the total volume of 7000 ml, stirring and mixing well;
buffer B: weighing 10-30 mmol/L of histidine hydrochloride, 5-20 mmol/L of methionine, and 210-280 mmol/L of sorbitol according to a formula, adding water for injection until reaching the total volume of 7000 ml, stirring and mixing well;
adding buffer A to buffer B, adjusting the pH to 5.5-6.5, which is a final buffer;
2) preparing a finished product:
a. transferring purified secukinumab into a sample cup of the ultrafiltration system and starting the ultrafiltration system, allowing the permeation rate 20-30 ml/min and the pressure no greater than 20 PSI (Pounds per square inch);
b. determining the concentration of the concentrated protein: taking out the concentrated protein, measuring the volume of the concentrated protein, determining protein concentration with an ultra-micro spectrophotometer, and starting to replace buffer when the protein concentration reaches 100-120 mg/ml;
c. replacing buffer: adding the final buffer at a volume equal to that of the concentrated protein sample into a sample cup, mixing well and concentrating the protein until the protein concentration is 100-120 mg/ml, and performing the replacement procedure 8 times; after each replacement, detecting the pH and conductivity of the permeate end liquid from the ultrafiltration system until identical or similar to those of the prepared buffer, indicating the end of the buffer replacement;
d. concentrating the secukinumab to 170-180 mg/ml by ultrafiltration after the buffer replacement, collecting the sample and recording its volume, rinsing the ultrafiltration system pipeline with the buffer, collecting the rinsing solution and adding it to the concentrated protein sample to make the protein concentration 140-160 mg/ml and the volume of 1100 ml, and adding polysorbate 80 to make the final concentration of polysorbate 80 to be 0.02%. In a sterile environment, filtering the resulting solution with a 0.22 μm filter membrane and then aliquoting the filtrate into prefilled syringes with a volume of 1 ml each, a total of 1,000 syringes, and labeling them.

For the preparation process of the above-mentioned secukinumab raw material, reference could be made to the original patent CN101001645A. The obtained secukinumab product has the same physical and chemical properties as the product made by the original manufacturer. The purified secukinumab contains acetate buffer components and thus has a pH of about 5, which is not conducive to the stability of the formulation. To ensure the stability of the formulation, buffer replacement is required.

The present disclosure further provides use of the stable secukinumab injection in the manufacture of a medicament for the treatment of psoriasis.

Through a large number of screening experiments on surfactants, sugars or sugar alcohols, amino acids, excipients, etc., and on pH and buffer respectively, the inventors screened out low molecular weight sugar alcohols, such as sorbitol and xylitol, to make a secukinumab injection. Compared with the original drug, the stability of the secukinumab injection provided by the present disclosure is significantly improved, which overcomes the shortcomings of the prior art, improving the stability of secukinumab injections, and has outstanding industrial applicability.

DETAILED DESCRIPTION

The present disclosure discloses a stable secukinumab injection and a preparation method thereof, which can be achieved by those skilled in the art through appropriately improving the process parameters in light of the present disclosure. It is to be understood that all such alternatives and modifications are apparent to those skilled in the art and are considered to be included in the present disclosure. The method and the application of the present disclosure have been described according to the preferred embodiments, and it is obvious that the method and application described herein may be changed or appropriately modified and combined without departing from the content, spirit and scope of the present disclosure.

All the raw materials and reagents used in the stable secukinumab injection and the preparation method thereof provided by the present disclosure are commercially available.

The present disclosure will be further explained below in conjunction with examples.

Experiment 1: Buffer

Evaluation of the effect of different buffers (phosphate, histidine, citrate) in prefilled syringes:

Formula 1: 150 mg/ml of secukinumab, 20 mmol/L of sodium dihydrogen phosphate and disodium hydrogen phosphate, 5 mmol/L of methionine, 200 mmol/L of trehalose, and 0.02% polysorbate 80, pH 5.8;

Formula 2: 150 mg/ml of secukinumab, 20 mmol/L of histidine and histidine hydrochloride, 5 mmol/L of methionine, 200 mmol/L of trehalose, and 0.02% polysorbate 80, pH 5.8;

Formula 3: 150 mg/ml of secukinumab, 20 mmol/L of citric acid and sodium citrate, 5 mmol/L of methionine, 200 mmol/L of trehalose, and 0.02% polysorbate 80, pH 5.8.

The above three formula injections were filled into prefilled syringes, and stability tests were conducted under long-term (4° C.), accelerated (25° C.) and high temperature (40° C.) conditions, to evaluate physical stability (SEC-HPLC, SEC polymer protein: General Requirements of Chinese Pharmacopoeia 2015), visible particles (Reference could be made to General Requirements of Chinese Pharmacopoeia 2015, 0904) and insoluble particles (Reference could be made to General Requirements of Chinese Pharmacopoeia 2015, 0903) measured by light blockage method, as well as chemical stability (CEX-HPLC, lysine variant, Reference could be made to General Requirements of Chinese Pharmacopoeia 2015, IIIB appendix). It can be seen from the results that the histidine and salt buffer system has better stability.

TABLE 1

SEC-HPLC test results (40° C., 4 weeks)

| Sample number | Buffer | SEC main peak purity (%) at time point 0 | SEC main peak purity (%) at week 1 | SEC main peak purity (%) at week 2 | SEC main peak purity (%) at week 3 | SEC main peak purity (%) at week 4 |
|---|---|---|---|---|---|---|
| 1 | Phosphate | 98.89 | 94.08 | 90.13 | 87.02 | 85.03 |
| 2 | Histidine | 98.87 | 96.34 | 94.71 | 92.04 | 90.57 |
| 3 | Citrate | 99.24 | 94.21 | 90.95 | 87.98 | 85.14 |

TABLE 2

CEX-HPLC test results (40° C., 4 weeks)

| Sample number | Buffer | CEX main peak purity (%) at time point 0 | CEX main peak purity (%) at week 1 | CEX main peak purity (%) at week 2 | CEX main peak purity (%) at week 3 | CEX main peak purity (%) at week 4 |
|---|---|---|---|---|---|---|
| 1 | Phosphate | 84.26 | 74.60 | 71.56 | 64.27 | 55.46 |
| 2 | Histidine | 82.58 | 76.46 | 73.21 | 68.47 | 62.70 |
| 3 | Citrate | 84.81 | 76.25 | 72.60 | 67.05 | 57.89 |

TABLE 3

SEC-HPLC test results (25° C., 12 weeks)

| Sample number | Buffer | SEC main peak purity (%) at time point 0 | SEC main peak purity (%) at week 2 | SEC main peak purity (%) at week 4 | SEC main peak purity (%) at week 8 | SEC main peak purity (%) at week 12 |
|---|---|---|---|---|---|---|
| 1 | Phosphate | 98.89 | 95.64 | 92.39 | 89.48 | 85.68 |
| 2 | Histidine | 98.76 | 96.11 | 94.76 | 93.20 | 91.80 |
| 3 | Citrate | 99.24 | 96.63 | 94.69 | 90.94 | 86.88 |

TABLE 4

CEX-HPLC test results (25° C., 12 weeks)

| Sample number | Buffer | CEX main peak purity (%) at time point 0 | CEX main peak purity (%) at week 2 | CEX main peak purity (%) at week 4 | CEX main peak purity (%) at week 8 | CEX main peak purity (%) at week 12 |
|---|---|---|---|---|---|---|
| 1 | Phosphate | 84.26 | 82.87 | 80.02 | 72.81 | 60.63 |
| 2 | Histidine | 82.58 | 83.30 | 81.88 | 78.27 | 65.99 |
| 3 | Citrate | 84.81 | 83.35 | 78.22 | 72.57 | 60.29 |

TABLE 5

SEC-HPLC test results (4° C., 16 weeks)

| Sample number | Buffer | SEC main peak purity (%) at time point 0 | SEC main peak purity (%) at week 4 | SEC main peak purity (%) at week 8 | SEC main peak purity (%) at week 12 | SEC main peak purity (%) at week 16 |
|---|---|---|---|---|---|---|
| 1 | Phosphate | 98.89 | 95.88 | 92.90 | 89.96 | 86.39 |
| 2 | Histidine | 98.76 | 96.02 | 95.00 | 93.50 | 92.26 |
| 3 | Citrate | 99.24 | 96.02 | 93.05 | 90.16 | 87.49 |

TABLE 6

| | | CEX-HPLC test results (4° C., 16 weeks) | | | | |
|---|---|---|---|---|---|---|
| Sample number | Buffer | CEX main peak purity (%) at time point 0 | CEX main peak purity (%) at week 4 | CEX main peak purity (%) at week 8 | CEX main peak purity (%) at week 12 | CEX main peak purity (%) at week 16 |
| 1 | Phosphate | 84.26 | 81.28 | 77.97 | 73.20 | 70.63 |
| 2 | Histidine | 84.58 | 82.29 | 80.35 | 79.33 | 77.86 |
| 3 | Citrate | 84.81 | 82.02 | 78.41 | 75.42 | 72.44 |

Experiment 2: pH

On the basis of the formula 150 mg/ml of secukinumab, 20 mmol/L of histidine and histidine hydrochloride, 5 mmol/L of methionine, 200 mmol/L of trehalose, and 0.02% polysorbate 80, the pH was adjusted to 4.5, 5.0, 5.5, 5.8, 6.0, 6.5 and 7.0, respectively, to identify the effect of different pH on the stability of secukinumab. The samples were stored under high temperature conditions for 4 weeks, and the stability of secukinumab was evaluated by SEC-HPLC and CEX-HPLC. It was determined from the results of SEC-HPLC and CEX-HPLC that protein aggregation and hydrolysis were the minimum at around pH 6.0.

Experiment 3: Stabilizer

For the preliminary formula development of injection formulations, it is necessary to evaluate the effects of different stabilizers on the soluble and insoluble aggregate formation of secukinumab (SEC-HPLC, DLS, visible particles and insoluble particles measured by light blockage method) and chemical stability (CEX-HPLC) during storage under long-term (4° C.), accelerated (25° C.) and high temperature (40° C.) storage conditions. Sorbitol, xylitol and trehalose were employed as the stabilizers and the formulae are as follows:

Formula 1: 150 mg/ml of secukinumab, 20 mmol/L of histidine and histidine hydrochloride, 5 mmol/L of methionine, 239 mmol/L of sorbitol, and 0.02% polysorbate 80, pH 5.8;

Formula 2: 150 mg/ml of secukinumab, 20 mmol/L of histidine and histidine hydrochloride, 5 mmol/L of methionine, 241 mmol/L of xylitol, and 0.02% polysorbate 80, pH 5.8;

Formula 3: 150 mg/ml of secukinumab, 20 mmol/L of histidine and histidine hydrochloride, 5 mmol/L of methionine, 200 mmol/L of trehalose, and 0.02% polysorbate 80, pH 5.8.

After the individual stability test in the early stage, the concentrations of sorbitol and xylitol used in the above formula were the optimal concentration for stability.

It can be seen from the results that the formula with xylitol or sorbitol as a stabilizer has better stability than that with trehalose. According to the formulae of the patent publication of the original drug, the optimal formula of the original drug in CN201580076632.9 is the formula 3. Therefore, the present disclosure overcomes the existing technical problems and further improves the stability of the injection.

TABLE 7

| | | SEC-HPLC test results (40° C., 4 weeks) | | | | |
|---|---|---|---|---|---|---|
| Sample number | Stabilizer | SEC main peak purity (%) at time point 0 | SEC main peak purity (%) at week 1 | SEC main peak purity (%) at week 2 | SEC main peak purity (%) at week 3 | SEC main peak purity (%) at week 4 |
| 1 | Sorbitol | 98.73 | 97.57 | 96.31 | 96.02 | 95.86 |
| 2 | Xylitol | 98.61 | 97.45 | 96.97 | 96.37 | 96.06 |
| 3 | Trehalose | 98.72 | 96.08 | 94.52 | 93.04 | 91.44 |

TABLE 8

| | | CEX-HPLC test results (40° C., 4 weeks) | | | | |
|---|---|---|---|---|---|---|
| Sample number | Stabilizer | CEX main peak purity (%) at time point 0 | CEX main peak purity (%) at week 1 | CEX main peak purity (%) at week 2 | CEX main peak purity (%) at week 3 | CEX main peak purity (%) at week 4 |
| 1 | Sorbitol | 82.77 | 75.14 | 71.99 | 69.83 | 66.02 |
| 2 | Xylitol | 82.67 | 79.92 | 76.80 | 73.43 | 69.02 |
| 3 | Trehalose | 82.77 | 72.05 | 69.84 | 64.14 | 61.07 |

TABLE 9

SEC-HPLC test results (25° C., 6 months)

| Sample number | Stabilizer | SEC main peak purity (%) at time point 0 | 1M SEC main peak purity (%) | 2M SEC main peak purity (%) | 3M SEC main peak purity (%) | 6M SEC main peak purity (%) |
|---|---|---|---|---|---|---|
| 1 | Sorbitol | 98.73 | 97.74 | 97.08 | 96.79 | 96.09 |
| 2 | Xylitol | 98.61 | 97.92 | 97.60 | 97.05 | 96.77 |
| 3 | Trehalose | 98.72 | 96.28 | 94.71 | 93.04 | 91.80 |

TABLE 10

CEX-HPLC test results (25° C., 6 months)

| Sample number | Stabilizer | CEX main peak purity (%) at time point 0 | 1M CEX main peak purity (%) | 2M CEX main peak purity (%) | 3M CEX main peak purity (%) | 6M CEX main peak purity (%) |
|---|---|---|---|---|---|---|
| 1 | Sorbitol | 82.77 | 79.28 | 75.96 | 72.73 | 70.34 |
| 2 | Xylitol | 82.67 | 80.14 | 78.38 | 75.31 | 73.29 |
| 3 | Trehalose | 82.77 | 79.66 | 73.79 | 70.24 | 68.47 |

TABLE 11

SEC-HPLC test results (4° C., 6 months)

| Sample number | Stabilizer | SEC main peak purity (%) at time point 0 | 1M SEC main peak purity (%) | 2M SEC main peak purity (%) | 3M SEC main peak purity (%) | 6M SEC main peak purity (%) |
|---|---|---|---|---|---|---|
| 1 | Sorbitol | 98.73 | 98.26 | 97.60 | 96.73 | 95.93 |
| 2 | Xylitol | 98.61 | 98.11 | 97.92 | 97.21 | 97.10 |
| 3 | Trehalose | 98.72 | 96.45 | 95.00 | 93.61 | 92.41 |

TABLE 12

CEX-HPLC test results (4° C., 6 months)

| Sample number | Stabilizer | CEX main peak purity (%) at time point 0 | 1M CEX main peak purity (%) | 2M CEX main peak purity (%) | 3M CEX main peak purity (%) | 6M CEX main peak purity (%) |
|---|---|---|---|---|---|---|
| 1 | Sorbitol | 82.77 | 82.50 | 82.32 | 82.05 | 81.55 |
| 2 | Xylitol | 82.67 | 82.61 | 82.10 | 81.99 | 81.70 |
| 3 | Trehalose | 82.77 | 82.05 | 80.61 | 79.34 | 78.22 |

Example 1

150 mg/ml of secukinumab, 20 mmol/L of histidine and histidine hydrochloride, 5 mmol/L of methionine, 239 mmol/L of sorbitol, and 0.02% polysorbate 80, in water for injection, pH 5.8.

The preparation method refers to Summary of the present disclosure.

Example 2

150 mg/ml of secukinumab, 20 mmol/L of histidine and histidine hydrochloride, 5 mmol/L of methionine, 241 mmol/L of xylitol, and 0.02% polysorbate 80, in water for injection, pH 5.8.

The preparation method refers to Summary of the present disclosure.

Example 3

150 mg/ml of secukinumab, 20 mmol/L of histidine and histidine hydrochloride, 5 mmol/L of methionine, 210 mmol/L of sorbitol, and 0.02% polysorbate 80, in water for injection, pH 5.8.

The preparation method refers to Summary of the present disclosure.

Example 4

150 mg/ml of secukinumab, 20 mmol/L of histidine and histidine hydrochloride, 5 mmol/L of methionine, 280 mmol/L of sorbitol, and 0.02% polysorbate 80, in water for injection, pH 5.8.

The preparation method refers to Summary of the present disclosure.

Example 5

140 mg/ml of secukinumab, 10 mmol/L of histidine and histidine hydrochloride, 5 mmol/L of methionine, 210 mmol/L of sorbitol, and 0.02% polysorbate 80, in water for injection, pH 5.8.

The preparation method refers to Summary of the present disclosure.

Example 6

160 mg/ml of secukinumab, 30 mmol/L of histidine and histidine hydrochloride, 20 mmol/L of methionine, 280 mmol/L of xylitol, and 0.02% polysorbate 80, in water for injection, pH 5.8.

The preparation method refers to Summary of the present disclosure.

Example 7

150 mg/ml of secukinumab, 20 mmol/L of histidine and histidine hydrochloride, 5 mmol/L of methionine, 210 mmol/L of xylitol, and 0.02% polysorbate 80, in water for injection, pH 5.8.

The preparation method refers to Summary of the present disclosure.

Example 8

150 mg/ml of secukinumab, 20 mmol/L of histidine and histidine hydrochloride, 5 mmol/L of methionine, 280 mmol/L of xylitol, and 0.02% polysorbate 80, in water for injection, pH 5.8.

The preparation method refers to Summary of the present disclosure.

The adjuvant materials of the above examples and experiments refer to Table 13.

The stable secukinumab injection and the preparation method thereof provided by the present disclosure have been described in detail above. The specific examples were used herein to illustrate the principles and embodiments of the present disclosure and the description of the above embodiments is only to assist in understanding the method of the present disclosure and the core idea thereof. It should be noted that, several improvements and modifications may be made by those skilled in the art to the present disclosure without departing from the principle of the present disclosure, and these improvements and modifications also fall within the protection scope of the claims of the present disclosure.

The invention claimed is:

1. A stable secukinumab injection formulation comprising 50-250 mg/ml of secukinumab, 5-50 mmol/L of histidine and histidine hydrochloride, 5-40 mmol/L of methionine, 150-370 mmol/L of xylitol, and 0.01%- 0.02% (v/v) of polysorbate 80, in water for injection, pH 5.0-7.0.

2. The stable secukinumab injection formulation according to claim 1, comprising 100-250 mg/ml of secukinumab, 10-40 mmol/L of histidine and histidine hydrochloride, 5-40 mmol/L of methionine, 180-350 mmol/L of xylitol.

3. The stable secukinumab injection formulation according to claim 1, comprising 140-200 mg/ml of secukinumab, 10-35 mmol/L of histidine and histidine hydrochloride, 5-30 mmol/L of methionine, 180-300 mmol/L of xylitol, and 0.02% (v/v) of polysorbate 80, in water for injection, pH 5.5-6.5.

4. The stable secukinumab injection formulation according to claim 1, comprising 140-160 mg/ml of secukinumab, 10-30 mmol/L of histidine and histidine hydrochloride, 5-20 mmol/L of methionine, 210-280 mmol/L of xylitol, and 0.02% (v/v) of polysorbate 80, in water for injection, pH 5.5-6.5.

TABLE 13

| Adjuvants | Specification | Manufacturer | Grade |
| --- | --- | --- | --- |
| Histidine | 25 kg/barrel | Shanghai Xiehe Amino Acid Co., Ltd. | Pharmaceutic adjuvant |
| Histidine Hydrochloride | 25 kg/barrel | Shanghai Xiehe Amino Acid Co., Ltd. | Pharmaceutic adjuvant |
| Methionine | 100 g/bag | Shanghai Wentai Biotechnology Co., Ltd. | Injection grade pharmaceutic adjuvant |
| Trehalose | 5 kg/barrel | Pfanstiehl | Pharmaceutic adjuvant |
| Polysorbate 80 | 100 ml/bottle | Nanjing Well Pharmaceutical Co., Ltd. | Injection grade pharmaceutic adjuvant |
| Sorbitol | 1000 g/bag | Guangxi Nanning Chemical Pharmaceutical Co., Ltd. | Pharmaceutic adjuvant |
| Xylitol | / | Hunan Jiudian Pharmaceutical Co., Ltd. | Pharmaceutic adjuvant |
| Sodium dihydrogen phosphate | 2000 g/bag | Chengdu Huayi Pharmaceutical Excipient Manufacturing Co., Ltd. | Pharmaceutic adjuvant |
| Disodium hydrogen phosphate | 2000 g/bag | Chengdu Huayi Pharmaceutical Excipient Manufacturing Co., Ltd. | Pharmaceutic adjuvant |
| Citric acid | 500 g/bottle | Hunan Er-Kang Pharmaceutical Co., Ltd. | Pharmaceutic adjuvant |
| Sodium citrate | 500 g/bottle | Hunan Er-Kang Pharmaceutical Co., Ltd. | Pharmaceutic adjuvant |

5. The stable secukinumab injection formulation according to claim 1, comprising 150 mg/ml of secukinumab, 20 mmol/L of histidine and histidine hydrochloride, 5 mmol/L of methionine, 210-280 mmol/L of xylitol, and 0.02% (v/v) of polysorbate 80, in water for injection, pH 5.5-6.5.

6. The stable secukinumab injection formulation according to claim 1, wherein the pH of the injection is 5.8.

7. A method for producing the stable secukinumab injection formulation according to claim 1, comprising
1) preparing buffer
   buffer A: weighing histidine, methionine, and xylitol according to a formula, adding water for injection until reaching formula concentrations, stirring and mixing well;
   buffer B: weighing histidine hydrochloride, methionine, and xylitol according to a formula, adding water for injection until reaching formula concentrations, stirring and mixing well;
   adding buffer A to buffer B, adjusting to final pH, which is a final buffer; and
2) preparing a finished product
   a) concentrating purified secukinumab by ultrafiltration;
   b) determining the concentration of the concentrated protein by taking out the concentrated protein, measuring the volume of the concentrated protein, determining protein concentration, and starting to replace buffer when the protein concentration reaches 100-120 mg/ml;
   c) replacing buffer by adding the final buffer at a volume equal to that of the concentrated protein into a sample cup, mixing well and repeating the replacement procedure several times, until the protein concentration is 100-120 mg/ml; and
   d) concentrating the secukinumab by ultrafiltration after replacing buffer, adding polysorbate 80, and performing sterile filtration.

8. A method of treating psoriasis, comprising administering the stable secukinumab injection formulation according to claim 1 to a subject in need thereof.

* * * * *